July 8, 1924.

J. W. KUHN

ROTARY PLOW

Filed April 18, 1922

1,500,502

WITNESSES
George G. Shyer

INVENTOR
J. W. Kuhn,
BY
Munn & Co.
ATTORNEYS

Patented July 8, 1924.

1,500,502

UNITED STATES PATENT OFFICE.

JOHN WILLIAM KUHN, OF BELLEVILLE, KANSAS.

ROTARY PLOW.

Application filed April 18, 1922. Serial No. 554,725.

*To all whom it may concern:*

Be it known that I, JOHN WILLIAM KUHN, a citizen of the United States, and a resident of Belleville, in the county of Republic and State of Kansas, have invented certain new and useful Improvements in Rotary Plows, of which the following is a specification.

My invention relates to plows, and it consists in the combinations, constructions and arrangements herein described and claimed.

An object of my invention is to provide an earth working device of novel construction and affording facilities for effectively cutting and breaking the surface soil and sub-soil and for thoroughly pulverizing and mixing the loosened soil at the same operation.

A further object of my invention is to provide a device of the character described which includes a plurality of revolubly supported cutting blades, each of which is adjustable at will to cut into or penetrate the soil to various depths, as desired.

A further object of my invention is to provide a device of the character described which is adapted to be "built in" or operatively applied to any one of a plurality of tractors of well known construction and to be actuated by a connection with a rotating element of the tractor.

A still further object of my invention is to provide a device of the character described which when operatively applied to a tractor, is adapted to perform at one operation, operations ordinarily requiring the use of a plurality of agricultural implements, such as a plow and a harrow, successively.

Other objects and advantages will be apparent from the following description, and the novel features of the invention will be particularly outlined in the appended claims.

My invention is illustrated in the accompanying drawings, forming a part of this application, in which:—

Figure 1:
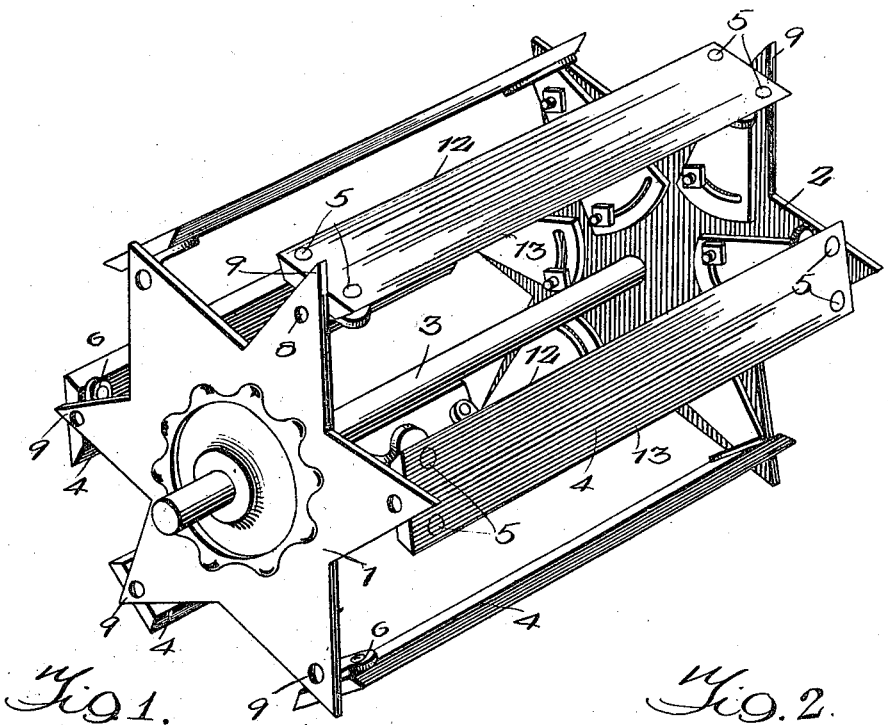
Figure 2:
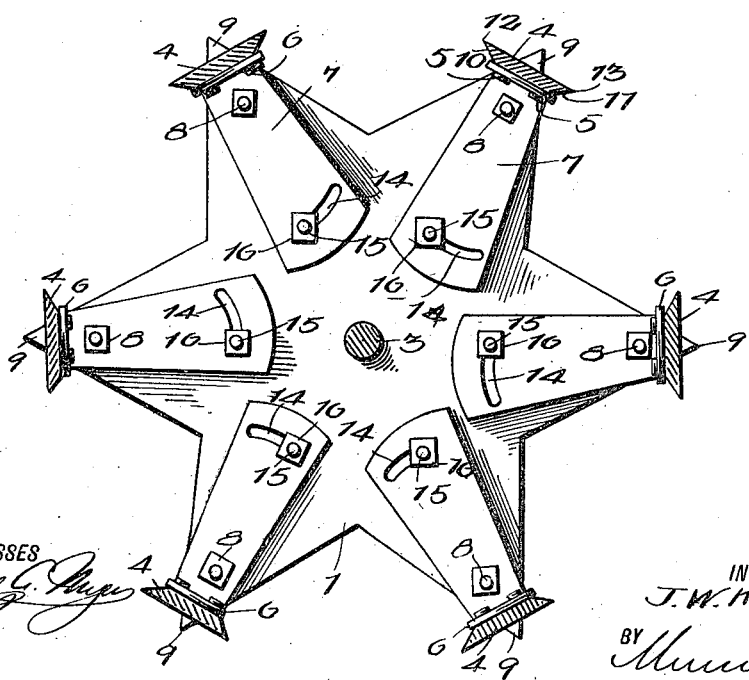

Fig. 1 is a perspective view of the embodiment of the invention detached from the tractor, and Fig. 2 is a transverse section through the structure shown in Fig. 1.

In carrying out my invention, I provide a pair of substantially star-shaped carrying members or wheels 1—2 which are rigidly mounted upon a shaft 3 so as to be disposed in spaced parallel relation. The arrangement is such that the vertices of the several pointed portions of each carrying member or frame are equi-distant from the axis of the shaft 3 and the corresponding pointed portions of the carrying members or wheels are positioned in transverse alinement with each other.

A plurality of substantially flat longitudinal blades 4 are provided, there being a blade for each pair of pointed portions of the star-shaped carrying members or wheels. The respective blades are arranged to extend between the respective pointed portions of the several pairs thereof and each blade is secured adjacent to its opposite ends, as by means of rivets 5, to laterally turned portions 6 of right angular substantially flat blade holding members 7.

The blade holding members 7 at the opposite ends of each blade, are pivotally attached in identical positions to the transversely alined pointed portions of the star wheels 1—2 at a slight distance from the vertices of such pointed portions and at points adjacent to the outer ends of the holding members 7, as indicated at 8 in the drawings. The arrangement is such that the longitudinal axes of the blades 4 extend in parallelism with the longitudinal axis of the shaft 3 and each blade will be revolved about an axis alined with the axes of alined pivot members 8 at the opposite ends of each blade when the blade holding members 7 attached to the blade are rotated about the axes of the said alined pivot members. The extreme ends of the pointed portions of the star-shaped carrying members or wheels extend beyond the outer faces of the blades 4, as indicated at 9.

The outer face or side of each blade 4 preferably lies in the same plane and the inner side of each blade is beveled along its side edges, as indicated at 10 and 11, respectively, to provide sharp cutting edges 12 and 13 respectively, at each side of the blade. It is desirable that the blades 4 should be supported in such manner that the angular relation of the outer faces of the blades in respect to radial lines extending thereto from the axis of the shaft 3, may be varied at will to vary the depth of penetration of the blades into a surface traversed by the star wheels and into which the points 9 will penetrate. To this end, each blade holding member 7 is provided adjacent to its inner end, with a transversely extending substantially arcuate slot 14 in which works a bolt 15 extending laterally of the adjacent side of one of the star wheels. Each blade holding member 7 may be clamped adjacent to its inner end to the star wheel upon which disposed and thus releasably held in adjusted position by means of a nut 16 threadedly engaging the bolt 15. It will be understood of course that the slots 14 of the blade holding members 7 at opposite ends of each blade will be transversely alined and that the studs or bolts 15 engaging therewith will be axially alined.

From the foregoing description of the various parts of the device, the operation thereof may be readily understood. It is intended that the shaft 3 shall be rotatably supported on the frame of a tractor or like vehicle, not shown, so that the points 9 will penetrate the earth to a depth sufficient to permit the blades 4 to cut into the soil to a desired depth, and the shaft 3 therefore has portions extending beyond the remote sides of the star wheels 1—2 for the purpose of association with a suitable support. The shaft 3 may be driven from any suitable rotating part of the supporting tractor or like vehicle.

The rotating blades will cut the surface soil and the sub-soil and thoroughly pulverize and mix the loosened soil, mixing therewith any fertilizers placed upon the soil or vegetable growth produced by the soil, thus both breaking the soil and placing it in condition for immediate planting or sowing at one operation. The loosened soil is thoroughly mixed and aerated. With the organization described, the ground may be broken close to fences, in fence corners and places inaccessible to plows of ordinary construction.

A plow embodying my invention is designed particularly and is especially valuable for use in the arid and semi-arid regions of the West and Southwestern parts of the United States, where owing to the drouth that prevails during the late summer and fall, the soil is so hard and dry that plowing with the usual types of mold-board plows does not satisfactorily break up the soil and in fact is practically impossible of accomplishment. Under these conditions the soil may be thoroughly broken up and placed in condition for planting at one operation so that wheat may be planted therein to germinate and grow with the advent of the first fall rains, whereby a great saving will result because of the increased yields made possible by the earlier plowing and sowing.

Obviously, my invention is susceptible of embodiment in forms other than that illustrated in the accompanying drawings, and I therefore consider as my own, all modifications and adaptations of the form herein described and illustrated as fairly fall within the scope of the appended claims.

I claim:—

1. In a device of the character described, a pair of spaced-apart parallel star wheels, said star wheels being axially alined and arranged with corresponding pointed portions thereof in transverse alinement, substantially flat blades arranged between corresponding pointed portions of the two star wheels, and each blade extending at its opposite sides beyond the planes of the side edges of a pair of the pointed projections of the star wheels, said blades having cutting edges at opposite sides thereof, and blade holding members arranged at opposite ends of each blade for attaching the latter to the star wheels, whereby the angular relation of said blade to a radial line extending thereto from the axes of the star wheels may be varied.

2. In a device of the character described, a pair of spaced apart parallel star wheels, said star wheels being axially alined and arranged with corresponding pointed portions thereof in transverse alinement, substantially flat blades adapted to extend between corresponding pointed portions of the two star wheels and each having a lateral cutting edge, a pair of right angular blade holding members for each blade, each blade holding member having a portion secured to an end portion of the blade and a portion extending at right angles to the first portion of the blade holder, said second named portion of the blade holder having a transversely extending slot therethrough, means for pivotally attaching the second named portions of the blade holders to alined pointed portions of the star wheels at alined points intermediate the arcuate slots and the first portions of the blade holders, and means carried by the star wheels for engaging the slots to releasably hold the blade holding members in alined adjusted relation to the star wheels, whereby the angular relation of each blade to a line leading radially thereto from a line alined with the axes of the star wheels may be varied at will.

JOHN WILLIAM KUHN.